United States Patent [19]

Imaseki

[11] Patent Number: 5,371,446
[45] Date of Patent: Dec. 6, 1994

[54] SYSTEM FOR AND METHOD OF DRIVING ELECTRIC AUTOMOTIVE VEHICLE

[75] Inventor: Takashi Imaseki, Zushi, Japan

[73] Assignee: Nissan Motor Company, Ltd., Yokohama, Japan

[21] Appl. No.: 15,010

[22] Filed: Feb. 9, 1993

[30] Foreign Application Priority Data

Feb. 12, 1992 [JP] Japan .................. 4-024868

[51] Int. Cl.⁵ .................................. H02P 5/46
[52] U.S. Cl. ............................. 318/52; 318/807
[58] Field of Search ............ 318/52, 68, 71, 66, 318/254, 799, 803, 808, 800, 807; 361/238, 239, 242, 236

[56] References Cited

U.S. PATENT DOCUMENTS

| | | | |
|---|---|---|---|
| 4,041,361 | 8/1977 | Cornell | 318/432 |
| 4,538,100 | 8/1985 | Tuten et al. | 318/808 |
| 4,686,434 | 8/1987 | Kojima et al. | 318/52 |
| 4,757,240 | 7/1988 | Mizobuchi et al. | 318/52 |
| 4,825,131 | 4/1989 | Nozaki et al. | 318/71 |

*Primary Examiner*—William M. Shoop, Jr.
*Assistant Examiner*—John W. Cabeca
*Attorney, Agent, or Firm*—Lowe, Price, LeBlanc & Becker

[57] ABSTRACT

A system for driving an electric automotive vehicle controls a slip frequency of a motor by feeding back to a signal control part a rotational speed detected by a motor speed sensor when the motor speed is normal. When the motor speed sensor is abnormal the system controls the slip frequency by feeding back to the signal control part the rotational speed estimated in accordance with an operating condition of the vehicle.

10 Claims, 6 Drawing Sheets

5,371,446

1

SYSTEM FOR AND METHOD OF DRIVING ELECTRIC AUTOMOTIVE VEHICLE

BACKGROUND OF THE INVENTION

The present invention relates generally to a system for driving an electric automotive vehicle and more particularly, to a system for controlling motors of the electric automotive vehicle.

JP-A 1-291603 discloses one prior art system for driving an electric automotive vehicle which includes a plurality of motor speed sensors for detecting a plurality of motors, respectively, and wherein even if any one of the plurality of motor speed sensors falls into malfunction, motor control can be continued by automatically separating it from a control system.

On the other hand, collected papers, article S9-3, published by DENKI GAKKAI (Electric Society of Japan) in 1991 in Japan, depicts sensorless control which is motor control without any motor speed sensor.

However, motor control as disclosed in JP-A 1-291603 has only one kind of input information, i.e. actual motor rotational speeds. Thus, if the actual motor rotational speeds cannot be obtained, motor control becomes divergent control and not convergent control such as feedback control, resulting in difficult maintenance of both responsibility and efficiency at a high level.

Likewise, sensorless control as depicted in the collected paper, article S9-3, belongs to divergent control, resulting in difficult maintenance of both responsibility and efficiency at a high level.

It is, therefore, an object of the present invention to provide a system for driving an electric automotive vehicle having excellent responsibility and efficiency, and sufficient reliability.

SUMMARY OF THE INVENTION

According to one aspect of the present invention, there is provided a system for driving an electric automotive vehicle having an electrical power conversion part for a motor and a signal control part for outputting a control signal to the electrical power conversion part in accordance with an accelerator opening degree, the system comprising:

a rotational speed sensor arranged to detect a rotational speed of the motor and generating a rotational speed indicative signal indicative of said rotational speed detected;

means for detecting an operating condition of electric automotive vehicle and generating and operating condition indicative signal indicative of said operating condition detected;

means for controlling a slip frequency of the motor by feeding back to the signal control part said rotational speed indicative signal;

means for estimating/controlling said slip frequency of the motor by feeding back to the signal control part a signal indicative of said rotational speed of the motor estimated in accordance with said operating condition indicative signal;

means for determining whether or not said rotational speed sensor is normal and generating a normal indicative signal when said rotational speed sensor is normal; and means for selecting said controlling means when said normal indicative signal is generated and said estimating/controlling means when said normal indicative signal fails to be generated.

According to another aspect of the present invention, there is provided a method of driving an electric automotive vehicle having a rotational speed sensor for detecting a rotational speed of a motor, an electrical power conversion part for the motor, and a signal control part for outputting a control signal to the power conversion part in accordance with an accelerator opening degree, the method comprising the steps of:

detecting a rotational speed of the motor and generating a rotational speed indicative signal indicative of said rotational speed detected;

detecting an operating condition of the electric automotive vehicle and generating an operating condition indicative signal indicative of said operating condition detected;

controlling a slip frequency of the motor by feeding back to the signal control part said rotational speed indicative signal;

estimating/controlling said slip frequency of the motor by feeding back to the signal control part a signal indicative of said rotational speed of the motor estimated in accordance with said operating condition indicative signal;

determining whether or not the rotational speed sensor is normal and generating a normal indicative signal when the rotational speed sensor is normal; and selecting said controlling step when said normal indicative signal is generated and said estimating/controlling step when said normal indicative signal fails to be generated.

DETAILED DESCRIPTION OF THE INVENTION

Figure 1:
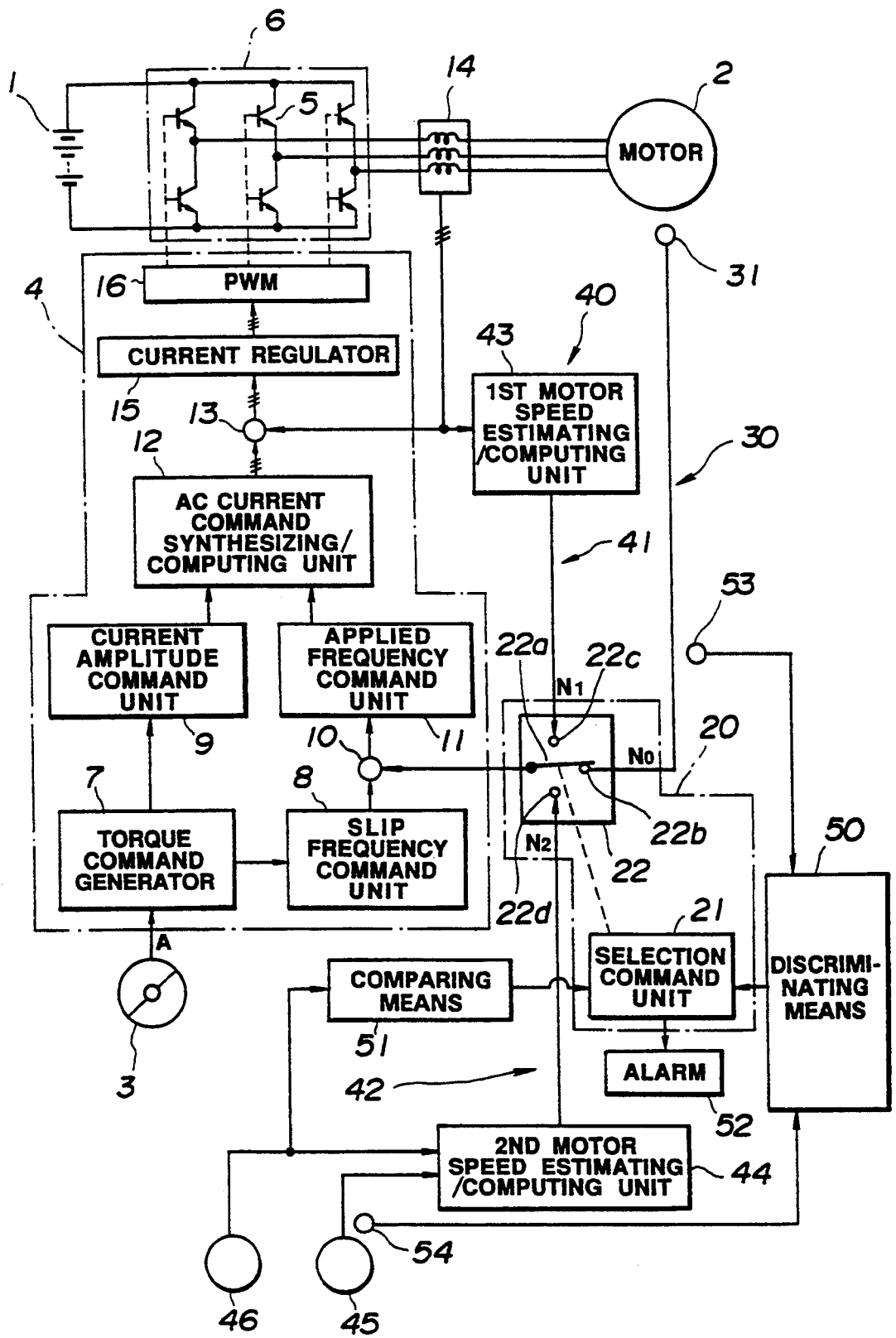
FIG. 1 is a block diagram showing a first preferred embodiment of a system for driving an electric automotive vehicle according to the present invention.

Referring first to FIG. 1, there is shown a first preferred embodiment of a system for driving an electric automotive vehicle wherein a power supply 1 includes a plurality of unit batteries which can provide high voltage. A motor 2 has an output shaft connected to driving wheels (not shown). An accelerator opening degree sensor 3 is arranged to detect an accelerator opening degree A as a manipulation amount of an accelerator manipulation part or accelerator pedal in an accelerator system, and output in accordance with this detection amount electric signal as an accelerator opening degree to a signal control part 4.

The signal control part 4 comprises a microcomputer which uses low voltage power fetched from the power supply 1 as its power supply, and it is arranged to output according to a program as previously set in a memory of the microcomputer as a system base and in response to command or the accelerator opening degree A derived from the accelerator opening degree sensor 3 control signal to a power conversion part or inverter 6 having power transistors 5.

Specifically, in the signal control part 4, a torque command generator 7 outputs in accordance with the accelerator opening degree A torque command to a slip frequency command unit 8 and a current amplitude command unit 9. The slip frequency command unit 8 outputs in response to torque command slip frequency command to a first operational amplifier 10. The first operational amplifier 10 adds one output of controlling means 30 or estimating/controlling means 40 selected by selecting means 20 to torque command derived from the slip frequency command unit 8, which is output to an applied frequency command unit 11. The applied frequency command unit 11 outputs in accordance with output derived from the first operational amplifier 10 applied frequency to an AC current command synthesizing/computing unit 12.

The current amplitude command unit 9 outputs in response to torque command derived from the torque command generator 7 current amplitude command to the AC current command synthesizing/computing unit 12. The AC current command synthesizing/computing unit 12 synthesizes and computes current amplitude command derived from the current amplitude command unit 9 and applied frequency derived from the applied frequency command unit 11 to obtain AC current amplitude command which is output to a second operational amplifier 13. The second operational amplifier 13 adds to AC current command derived from the AC current command synthesizing/computing unit 12 detected motor current derived from a motor current sensor 14 for detecting motor current to be supplied to the motor 2 from the power supply 1 via the power conversion part 5, which is output to a current regulator 15. The current regulator 15 outputs in accordance with output derived from the second operational amplifier 13 current value to a pulse width modulator (PWM) 16. The pulse width modulator 16 outputs in accordance with output derived from the current regulator 15 pulse width modulation command to a base of each power transistor 5 of the power conversion part 6.

Thus, the power conversion part 6 converts power of the power supply 1 into power to be supplied to the motor 2 in response to control signal in accordance with the accelerator opening degree A derived from the signal control part 4. Additionally, the controlling means 30 feed back to the first operational amplifier 10 of the signal control part 4 via the selecting means 20 electric signal in accordance with a detected speed $N_0$ derived from the motor speed sensor 31 for detecting a rotational speed of the motor 2, thus controlling slip frequency of the motor 2.

Estimating/controlling means 40 are arranged to estimate and compute the rotational speed of the motor 2 in accordance with operating conditions detected by operating condition detecting means such as a motor current sensor 14, a vehicular speed sensor 45, a gear ratio sensor 46, etc., which is fed back to the signal control part 4 via the selecting means 20, thus controlling slip frequency. Specifically, the estimating/controlling means 40 comprises first and second estimating/controlling means 41, 42.

The first estimating/controlling means 41 includes a first motor rotational speed estimating/computing unit 43. The first motor rotational speed estimating/computing unit 43 receives detected current from the motor current sensor 14, which is applied to a functional equation as previously set, thus estimating and computing a rotational speed $N_1$ of the motor 2. Additionally, the first motor rotational speed estimating/computing unit 43 feeds back to the first operational amplifier 10 of the signal control part 4 via the selecting means 20 electric signal corresponding to the motor rotational speed $N_1$ as estimated and computed, thus controlling slip frequency of the motor 2.

The second estimating/controlling means 42 include a second motor rotational speed estimating/computing unit 44. The second motor rotational speed estimating/computing unit 44 receives a detected vehicular speed from the vehicular speed sensor 45 for detecting a vehicular speed and a detected gear ratio from the gear ratio sensor 45 for detecting a gear ratio selected by a transmission (not shown), which are applied to a functional equation as previously set, thus estimating and computing a rotational speed $N_2$ of the motor 2. Additionally, the second motor rotational speed estimating/computing unit 44 feeds back to the first operational amplifier 10 of the signal control part 4 via the selecting means 20 electric signal corresponding to the motor rotational speed $N_2$ as estimated and computed, thus controlling slip frequency of the motor 2.

The selecting means 20 include a selection command unit 21 and a switch 22. The selection command unit 21 receives discrimination signal from discriminating means 50 and comparison signal from comparating means 51, and outputs selection command to a movable contact 22a of the switch 22. In response to selection command derived from the selection command unit 21, the movable contact 22a of the switch 22 is electrically connected to any one of a first stationary contact 22b connected to an output terminal of the motor speed sensor 31 of the controlling means 30, a second stationary contact 22c connected to an output terminal of the first motor rotational speed estimating/computing unit 43 of the first estimating/controlling means 41, and a third stationary contact 22d connected to an output terminal of the second motor rotational speed estimating/computing unit 44 of the second estimating/controlling means 42. The movable contact 22a of the switch 22 is connected to a feedback input terminal of the operational amplifier 10 of the signal control part 4. Additionally, when outputting selection command to connect the movable contact 22a of the switch 22 to any one of the second and third stationary contacts 22c, 22d, the selection command unit 21 outputs alarm command to an alarm 52, and prohibits subsequent selection of the controlling means 30.

The discriminating means 50 outputs in response to output signal derived from first and second anomaly sensors 53, 54 discrimination signal to the selection command unit 21 of the selecting means 20. The first anomaly sensor 53 detects a presence of anomaly of the motor speed sensor 31, e.g. disconnection or short-circuit therein, or a presence of anomaly of a signal system from the motor speed sensor 31 to the selecting means 20, and it outputs in accordance with this detection result electric signal to the discriminating means 50. The second anomaly sensor 53 detects a presence of anomaly of the vehicular speed sensor 45, e.g. disconnection or short-circuit therein, or a presence of anomaly of a signal system from the vehicular speed sensor 45 to the second motor rotational speed estimating/computing unit 44, and it outputs in accordance with this detection result electric signal to the discriminating means 50.

Next, the operation of the first preferred embodiment will be described. Ordinarily, the movable contact 22a of the switch 22 of the selecting means 20 is connected to the first stationary contact 22b as shown in FIG. 1. When a driver turns on a main switch (not shown), the power supply 1 provides power to the signal control part 4, the selecting means 20, the discriminating means 50, the comparing means 51, etc. If, in this state, the driver manipulates the accelerator manipulation part (not shown), the accelerator opening degree sensor 3 outputs in accordance with the manipulation amount the accelerator opening degree A to the signal control part 4. Then, the signal control part 4 outputs in accordance with the accelerator opening degree A control signal to the power conversion part 6 which in turn provides from the power supply 1 to the motor 2 power in accordance with control signal derived from the signal control part 4. Thus, with power running of the motor 2 controlled, the driving wheels (not shown) as connected to the output shaft of the motor 2 are driven and rotated, running the electric automotive vehicle in accordance with the accelerator opening degree A.

Figure 2:
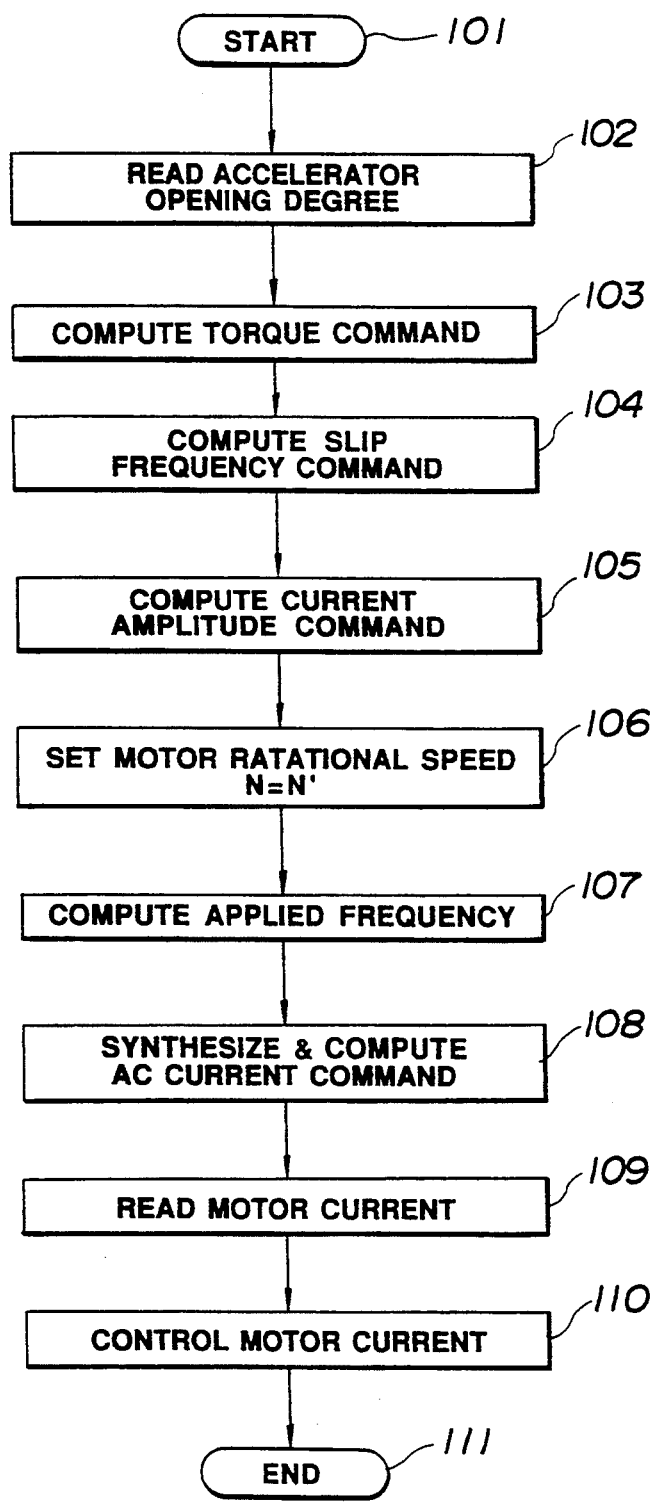
FIG. 2 is a flowchart showing driving torque control in the first preferred embodiment.

Referring to FIG. 2, driving torque control of the motor 2 for cruising of the electric automotive vehicle will be described according to a flowchart as shown in FIG. 2. Subsequent to start of torque control at a step 101, the accelerator opening degree A is read at a step 102. Then, at a step 103, torque command is computed in accordance with the accelerator opening degree A, and at a step 104, slip frequency command is computed, and at a step 105, current amplitude command is computed. At a subsequent step 106, the motor rotational speed N is set to N' (N=N'). Since, ordinarily, the switch 22 serves to feed back to the signal control part 4 the detected rotational speed $N_0$ derived from the motor speed sensor 31, applied frequency is computed at a step 107 in accordance with the motor rotational speed N as set and the detected rotational speed $N_0$ as fed back. Then, at a step 108, AC current command is synthesized and computed, and at a step 109, detected motor current derived from the motor current sensor 14 is read. At a subsequent step 110, current to be supplied to the motor 2 is controlled, then control returns via a step 111 to the step 102.

Figure 3:
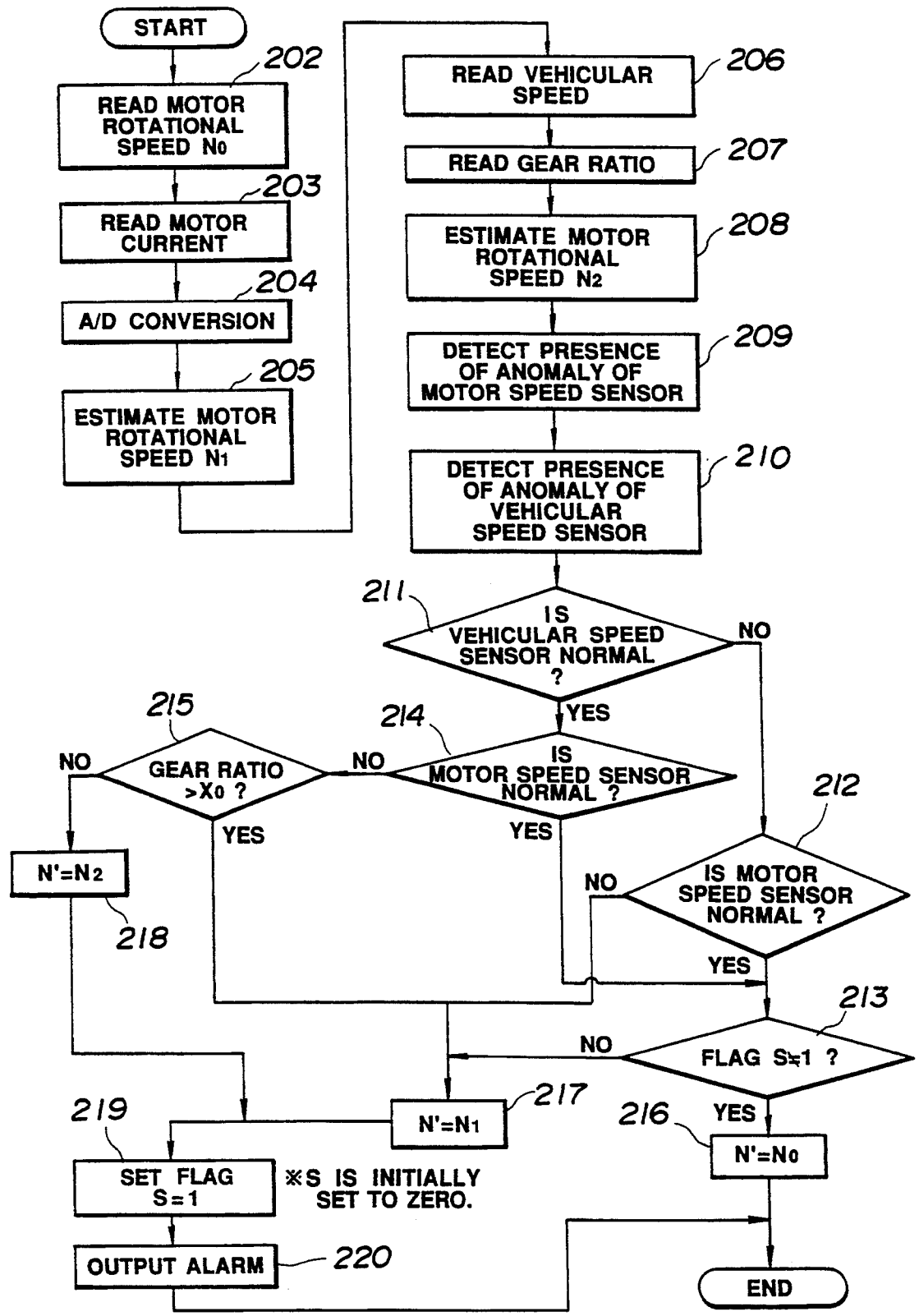
FIG. 3 is a view similar to FIG. 2, showing sensor anomaly control in the first preferred embodiment.

Referring to FIG. 3, sensor anomaly control will be described according to a flowchart as shown in FIG. 3. Subsequent to start of sensor anomaly control at a step 201, the detected motor rotational speed $N_0$ derived from the motor speed sensor 31 is read at a step 202, and the detected motor current derived from the motor current sensor 14 is read at a step 203. Then, at a step 204, analog-to-digital conversion of a value of the detected motor current is carried out, and at a step 205, the first motor rotational speed $N_1$ is estimated and computed. At a step 206, the detected vehicular speed derived from the vehicular speed sensor 45 is read, and at a step 207, the detected gear ratio derived from the gear ratio sensor 46 is read. At a subsequent step 208, the second motor rotational speed $N_2$ is estimated and computed. Then, at a step 209, the detected output derived from the first anomaly sensor 53, and at a step 210, the detected output derived from the second anomaly sensor 54 is read. At subsequent steps 211, 212, 213, 214, and 215, it is determined whether or not the signal system of the vehicular sensor 45 and that of the motor speed sensor 31 are normal, and whether or not the gear ratio is greater than a predetermined value $X_0$. Based on this determination, the selecting means 20 is selectively actuated for selectively using the controlling means 30 and the estimating/controlling means 40 comprising the first and second estimating/controlling means 41, 42 as described in connection with the following (1)-(7).

(1) If the signal system of the vehicular speed sensor 45 is abnormal, and that of the motor speed sensor 31 is normal, and the first and second estimating/controlling means 41, 42 have not been selected once (i.e. the answer at the step 211 is NO, and the answer at the step 212 is YES, and the answer at the step 213 is YES), control proceeds to a step 216 wherein the selecting means 20 select the controlling means 30. That is, the movable contact 22a of the switch 22 is kept connected to the first stationary contact 22b, and the detected motor rotational speed $N_0$ derived from the motor speed sensor 31 is fed back to the signal control part 4 ($N'=N_0$). Then, at a step 221, one cycle of sensor anomaly control comes to end.

(2) If the signal system of the vehicular sensor 45 is abnormal, and that of the motor speed sensor 31 is normal, and the first and second estimating/controlling means 41, 42 have been selected once (i.e. the answer at the step 211 is NO, and the answer at the step 212 is YES, and the answer at the step 213 is NO), control proceeds to a step 217 wherein the selecting means 20 select the first estimating/controlling means 41. That is, the movable contact 22a of the switch 22 is switched and connected to the second stationary contact 22c, and the motor rotational speed $N_1$ as estimated and computed in accordance with detected motor current is fed back to the signal control part 4 ($N'=N_1$). Subsequently, at a step 219, a flag S is set to 1 (S=1) which means that the first and second estimating/controlling means 41, 42 are selected, and at a step 220, alarm is output. Then, at the step 221, one cycle of sensor anomaly control comes to end.

(3) If the signal system of the vehicular sensor 45 and that of the motor speed sensor 31 are both abnormal (i.e. the answers at the steps 211 and 212 are both NO), control proceeds to the step 217 wherein the same processing as (2) is carried out.

(4) If the signal system of the vehicular sensor 45 and that of the motor speed sensor 31 are both normal, and the first and second estimating/controlling means 41, 42 have not been selected once (i.e. all the answers at the steps 211, 213, and 214 are YES), control proceeds to the step 216 wherein the same processing as (1) is carried out.

(5) If the signal system of the vehicular sensor 45 and that of the motor speed sensor 31 are both normal, and the first and second estimating/controlling means 41, 42 have been selected once (i.e. the answers at the steps 211 and 212 are both YES, and the answer at the step 213 is NO), control proceeds to the step 217 wherein the same processing as (2) is carried out.

(6) If the signal system of the vehicular sensor 45 is normal, and that of the motor speed sensor 31 is abnormal, and the detected gear ratio is greater than the predetermined value $X_0$ (i.e. the answer at the step 211 is YES, and the answer at the step 214 is NO, and the answer at the step 215 is YES), the motor rotational speed $N_2$ as estimated and computed in accordance with the detected vehicular speed has low resolution and bad accuracy, and thus control proceeds to the step 217 wherein the same processing as (2) is carried out.

(7) If the signal system of the vehicular sensor 45 is normal, and that of the motor speed sensor 31 is abnormal, and the detected gear ratio is smaller than the predetermined value $X_0$ (i.e. the answer at the step 211 is YES, and the answers at the steps 214 and 215 are both NO), control proceeds to a step 218 wherein the selecting means 20 select the second estimating/controlling means 42. That is, the movable contact 22a of the switch 22 is switched and connected to the third stationary contact 22d, and the motor rotational speed $N_2$ as estimated and computed in accordance with the detected vehicular speed is fed back to the signal control part 4 ($N'=N_2$). Subsequently, at the step 219, the flag S is set to 1 ($S=1$), and at the step 220, alarm is output. Then, at the step 221, one cycle of sensor anomaly control comes to end.

In brief, according to the first preferred embodiment, if the vehicular speed sensor 45 and the motor speed sensor 31 are both normal, the detected motor rotational speed $N_0$ is fed back to the signal control part 4. If the motor speed sensor 31 is abnormal, and the vehicular speed sensor 45 is normal, and the detected gear ratio is smaller than the predetermined value $X_0$, the motor rotational speed $N_2$ as estimated and computed in accordance with the detected vehicular speed has high resolution and good accuracy, and thus it is fed back to the signal control part 4. If the motor speed sensor 31 is abnormal, and the vehicular speed sensor 45 is normal, and the detected gear ratio is greater than the predetermined value $X_0$, the motor rotational speed $N_2$ as estimated and computed in accordance with the detected vehicular speed has low resolution, and thus, only in this case, the motor rotational speed $N_1$ as estimated and computed in accordance with detected motor current is fed back to the signal control part 4.

That is, according to the first preferred embodiment, the detected motor rotational speed $N_0$ derived from the motor speed sensor 31, the motor rotational speed $N_1$ as estimated in accordance with detected motor current, and the motor rotational speed $N_2$ as estimated in accordance with the detected vehicular speed are appropriately and selectively used according to conditions of the motor speed sensor 31 and the vehicular speed sensor 45 as well as conditions of the detected gear ratio so as to minimize, in torque control of the motor 2, the use of the motor rotational speed $N_1$ as estimated in accordance with detected motor current which is apt to be affected by current ripple, etc., resulting in achievement of both responsibility and efficiency at a high level, and sufficient reliability.

Figure 4A:
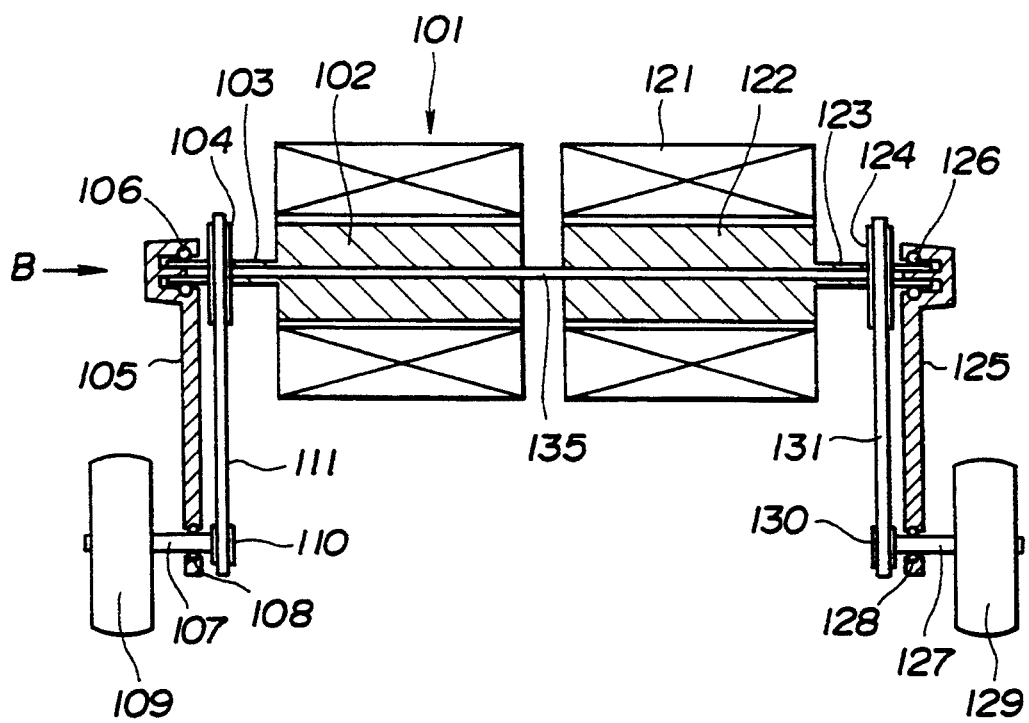
FIG. 4A is a sectional view showing a second preferred embodiment of the present invention.
Figure 4B:
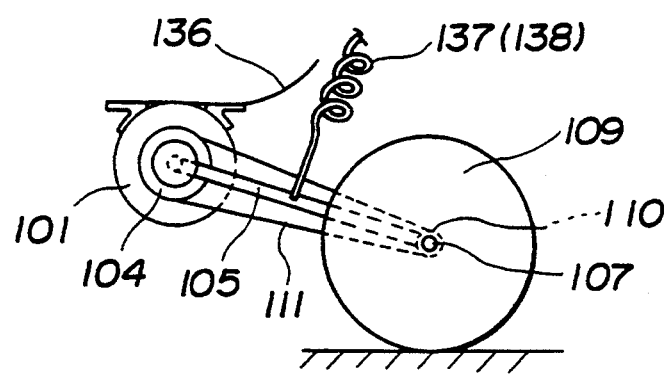
FIG. 4B is a side view of the second preferred embodiment as viewed from an arrow B in FIG. 4A.

Referring to FIGS. 4A and 4B, there is shown a second preferred embodiment of a system for driving an electric automotive vehicle wherein a plurality of motors serve to drive right and left driving wheels. Referring to FIG. 4A, a left motor 101 and a right motor 121 are disposed coaxially.

The left motor 101 includes a rotor 102 which is hollow, i.e. has a through hole in its center portion. The rotor 102 has a left end face from which a tubular output shaft 103 protrudes coaxially. A driving gear 104 is fixedly engaged with the output shaft 103 which has a left end portion protruding from the driving gear 104 with which a base of an arm 105 is rotatably engaged through a bearing 106. The arm 105 has an end portion with which a wheel shaft 107 is rotatably engaged through a bearing 108. The wheel shaft 107 has a left end portion protruding from the arm 105 to which a left tire 109 as secured to a wheel (not shown) is mounted, and a right end portion protruding from the arm 105 to which a driven gear 110 is fixedly mounted. An endless chain 111 interconnects the driven gear 110 and the driving gear 104.

The right motor 121 includes a rotor 122 which is hollow, i.e. has a through hole in its center portion. The rotor 122 has a right end face from which a tubular output shaft 123 protrudes coaxially. A driving gear 124 is fixedly engaged with the output shaft 123 which has a right end portion protruding from the driving gear 124 with which a base of an arm 125 is rotatably engaged through a bearing 126. The arm 125 has an end portion with which a wheel shaft 127 is rotatably engaged through a bearing 128. The wheel shaft 127 has a right end portion protruding from the arm 125 to which a right tire 129 as secured to a wheel (not shown) is mounted, and a left end portion protruding from the arm 125 to which a driven gear 130 is fixedly mounted. An endless chain 131 interconnects the driven gear 130 and the driving gear 124.

It is to be noted that a distance of the arm 105 between the output shaft 103 and the wheel shaft 107 is equal to that of the arm 125 between the output shaft 123 and the wheel shaft 127.

A torsion bar 135 is rotatably fitted through center portions of the output shaft 103, the rotor 102, the rotor 122, and the output shaft 123. The torsion bar 135 has a left end coupled to the base of the arm 105, and a right end coupled to the base of the arm 125.

Referring to FIG. 4B, the motors 101, 121 are mounted to a vehicular body 136. Springs or coil springs 137, 138 have one ends fixed to the vehicular body 136, and another ends fixed to the arms 105, 125 separately, and serve to bias the arms 105, 125 clockwise as viewed in FIG. 4B.

Therefore, according to the second preferred embodiment, torque of the motors 101, 121 is transmitted from the rotors 102, 122 to the tires 109, 129 via the output shafts 103, 123, the driving gears 104, 124, the chains 111, 131, the driven gears 110, 130, and the wheel shafts 107, 127. The operation as a reduction gear can be obtained by changing the gear ratio of the driving gears 104, 124 to the driven gears 110, 130. Further, the arms 105, 125 are constructed to be rotatable together with the tires 109, 129, the wheel shafts 107, 127, the driven gears 110, 130, and the chains 111, 131 on the output shafts 103, 123 of the motors 101, 121, resulting in a compact power transmission having a suspension of the full trailing arm type.

Furthermore, since the torsion bar 135 is rotatably fitted through the center portions of the rotors 102, 122 and the output shafts 103, 123, and is connected to the arms 105, 125, a torque transmission system comprising the rotors 102, 122, the output shafts 103, 123, the driving gears 104, 124, the chains 111, 131, the driven gears 110, 130, the wheel shafts 107, 127, and the tires 109, 129 is constructed to be separate from a suspension arm system comprising the arms 105, 125 and the torsion bar 135. Thus, with vertical motion of the tires 109, 129, the arms 105, 125 are rotated on the output shafts 103, 123 of the rotors 102, 122. When a phase difference occurs between rotary motions of the arms 105, 12S, force for canceling this phase difference, i.e. anti-roll action is produced in the torsion bar 135 which is capable of moving independent of the torque transmission system and connected to the arms 105, 125, obtaining a stabilizer effect.

Figure 5A:
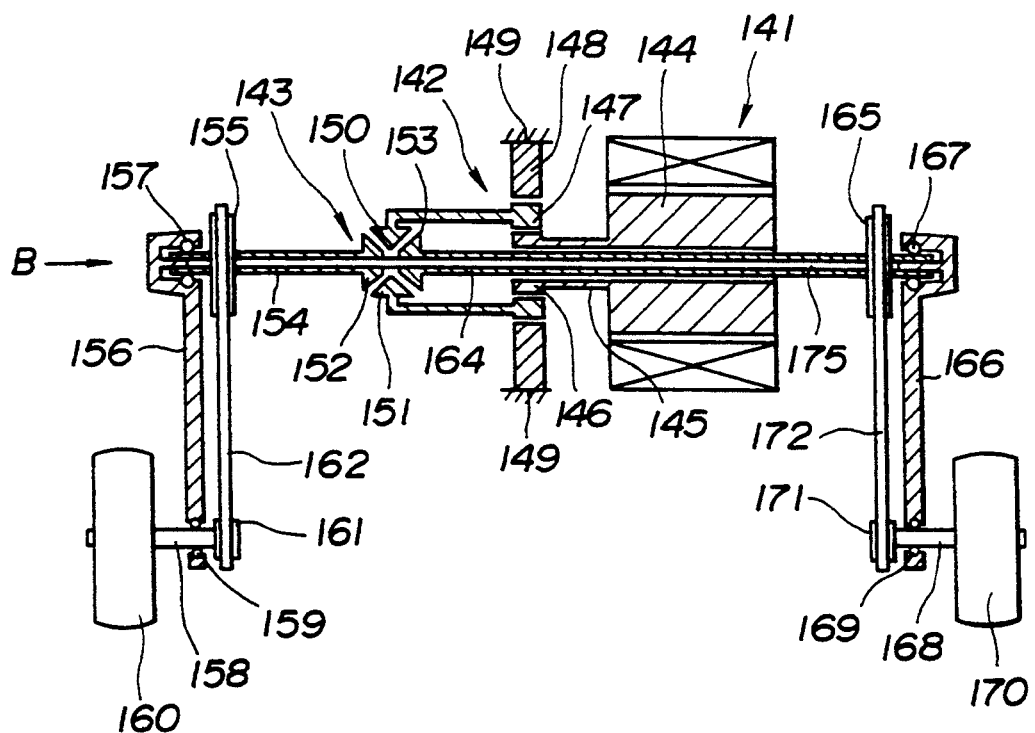
FIG. 5A is a view similar to FIG. 4A, showing a third preferred embodiment of the present invention.
Figure 5B:
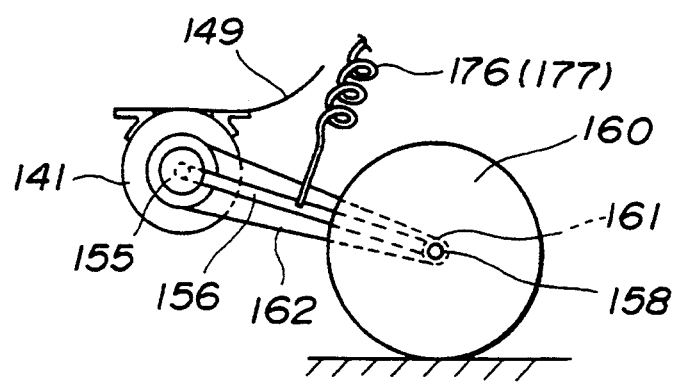
FIG. 5B is a view similar to FIG. 4B, showing the third preferred embodiment as viewed from an arrow B in FIG. 5A.

Referring to FIGS. 5A and 5B, there is shown a third preferred embodiment of a system for driving an electric automotive vehicle wherein right and left driving wheels are driven by a single motor. Referring to FIG. 5A, a motor 141, a reduction gear 142, and a differential gear 143 are disposed coaxially.

The motor 141 includes a rotor 144 which is hollow, i.e. has a through hole in its center portion. The rotor 144 has a left end face from which a tubular output shaft 145 protrudes coaxially. The reduction gear 142 is mounted to the output shaft 145, and comprises a sun gear 146 formed with the output shaft 145 on the outer peripheral face of its end portion, annular planetary gears 147 engaged with the sun gear 146, and a ring gear 148 engaged with the planetary gears 147. The ring gear 148 is secured to a vehicular body 149.

The differential gear 143 comprises pinion mated gears 150, 151 connected to the planetary gears 147 of the reduction gear 142, and side gears 152, 153 engaged with the pinion mated gears 150, 151. Each of the side gears 152, 153 is hollow, i.e. has a though hole in its center portion, and is disposed to be coaxial with the rotor 144 of the motor 141.

The left side gear 152 has a left end face from which a tubular intermediate shaft 154 protrudes coaxially. A driving gear 155 is fixedly engaged with the intermediate shaft 154 which has a left end portion protruding from the driving gear 155 with which a base of an arm 156 is rotatably engaged through a bearing 157. The arm 156 has an end portion with which a wheel shaft 158 is rotatably engaged through a bearing 159. The wheel shaft 158 has a left end portion protruding from the arm 156 to which a left tire 160 as secured to a wheel (not shown) is mounted, and a right end portion protruding from the arm 156 to which a driven gear 161 is fixedly mounted. An endless chain 162 interconnects the driven gear 161 and the driving gear 155.

The right side gear 153 has a right end face from which a tubular intermediate shaft 164 protrudes coaxially. The intermediate shaft 164 is rotatably fitted through center portions of the output shaft 145 and the rotor 144. The intermediate shaft 164 has a right portion protruding from the rotor 144 with which a driving gear 165 is fixedly engaged, and a right end portion protruding from the driving gear 165 with which a base of an arm 166 is rotatably engaged through a bearing 167. The arm 166 has an end portion with which a wheel shaft 168 is rotatably engaged through a bearing 169. The wheel shaft 168 has a right end portion protruding from the arm 166 to which a right tire 170 as secured to a wheel (not shown) is mounted, and a left end portion protruding from the arm 166 to which a driven gear 171 is fixedly mounted. An endless chain 172 interconnects the driven gear 171 and the driving gear 165.

It is to be noted that a distance of the arm 156 between the intermediate shaft 154 and the wheel shaft 158 is equal to that of the arm 166 between the intermediate shaft 164 and the wheel shaft 168.

A torsion bar 175 is rotatably fitted through center portions of the left intermediate shaft 154, the left side gear 152, the right side gear 153, and the right intermediate gear 164. The torsion bar 175 has a left end coupled to the base of the arm 156, and a right end coupled to the base of the arm 166.

Referring to FIG. 5B, the motor 141 is mounted to a vehicular body 149. Springs or coil springs 176, 177 have one ends fixed to the vehicular body 149, and another ends fixed to the arms 156, 166 separately, and serve to bias the arms 156, 166 clockwise as viewed in FIG. 5B.

Therefore, according to the third preferred embodiment, torque of the motor 141 is transmitted from the rotor 144 to the tires 160, 170 via the output shaft 145, the reduction gear 142, the differential gear 143, the intermediate gears 154, 164, the driving gears 155, 165, the chains 162, 172, the driven gears 161, 171, and the wheel shafts 158, 168. The arms 156, 166 are constructed to be rotatable together with the tires 160, 170, the wheel shafts 158, 168, the driven gears 161, 171, and the chains 162, 172 on the intermediate shafts 154, 164 connected to the output shaft 145 of the motor 141 via the reduction gear 142 and the differential gear 143, resulting in a compact power transmission having a suspension of the full trailing arm type in the similar way as the second preferred embodiment as shown in FIGS. 4A and 4B.

Furthermore, since the torsion bar 175 is rotatably fitted through the center portions of the rotor 144, the output shaft 145, the reduction gear 142, the differential gear 143, and the intermediate shafts 154, 164, and is connected to the arms 156, 166, a torque transmission system comprising the rotor 144, the output shaft 145, the reduction gear 142, the differential gear 143, the intermediate shafts 154, 164, the driving gears 155, 165, the chains 162, 172, the driven gears 161, 171, the wheel shafts 158, 168, and the tires 160, 170 is constructed to be separate from a suspension arm system comprising the arms 156, 166 and the torsion bar 175. Thus, in the similar way as the second preferred embodiment as shown in FIGS. 4A and 4B, when vertical motion of the tires 160, 170 causes a phase difference between rotary motions of the arms 156, 166 which rotate on the intermediate shafts 154, 164, force for canceling this phase difference, i.e. anti-roll action, is produced in the torsion bar 135, obtaining a stabilizer effect.

The operation as a reduction gear can be obtained by changing the gear ratio of the driving gears 155, 165 to the driven gears 161, 171.

Figure 6:
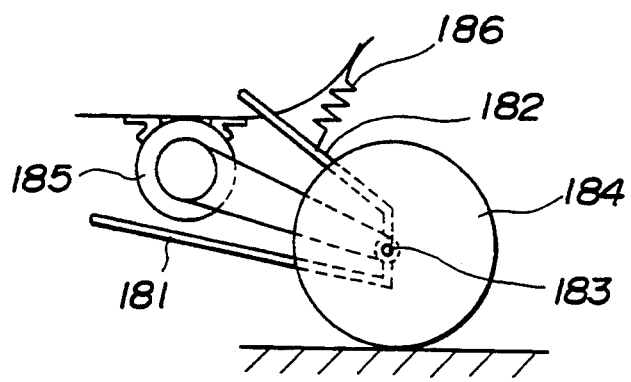
FIG. 6 is a view similar to FIG. 5B, showing a fourth preferred embodiment of the present invention.

Referring to FIG. 6, there is shown a fourth preferred embodiment of a system for driving an electric automotive vehicle which is characterized by disposing a lower arm 181 and an upper arm 182 in place of the arms 105, 125, 156, 166 as shown in FIGS. 4A and 5A so as to structure a suspension of the double wishbone type comprising the lower and upper arms 181, 182 and a torsion bar 183 corresponding to the torsion bars 135, 175 as shown in FIGS. 4A and 5A. It is to be noted that the upper arm 182 is shorter than the lower arm 181.

In FIG. 6, reference numeral 185 designates a motor corresponding to the motors 101, 102, 141 as shown in FIGS. 4A and 5A, and reference numeral 186 designates a spring corresponding to the springs 137, 138, 176, 177 as shown in FIGS. 4B and 5B.

Therefore, according to the fourth preferred embodiment, a variation of a vehicular wheel base can be reduced as compared with a vertical displacement of a tire 184 corresponding to the tires 109, 129, 160, 170 as shown in FIGS. 4A and 5A. Further, it is possible to decrease a phenomenon that the suspension is lifted by winding-up of the tire 184 when applying traction to the tire 184.

What is claimed is:

1. A system for driving an electric automotive vehicle having an electrical power conversion part for a motor and a signal control part for outputting a control signal to the electrical power conversion part in accordance with an accelerator opening degree, the system comprising:

a rotational speed sensor arranged to detect a rotational speed of the motor and generating a rotational speed indicative signal indicative of the detected rotational speed;

means for detecting an operating condition of the electric automotive vehicle and generating an operating condition indicative signal indicative of the detected operating condition;

means for controlling a slip frequency of the motor by feeding back to the signal control part said rotational speed indicative signal;

means for estimating and controlling said slip frequency of the motor by feeding back to the signal control part an estimated rotational speed indicative signal indicative of an estimated value of said rotational speed of the motor estimated in accordance with said operating condition indicative signal;

means for determining whether or not said rotational speed sensor is normal and generating a normal indicative signal when said rotational speed sensor is normal; and means for selecting between said controlling means and said estimating and controlling means for controlling said slip frequency of the motor by selecting said controlling means when said normal indicative signal is generated and selecting said estimating and controlling means when said normal indicative signal fails to be generated.

2. A system as claimed in claim 1, wherein said operating condition detecting means include a motor current sensor for detecting a current of the motor, a vehicular speed sensor for detecting a vehicular speed, and a gear ratio sensor for detecting a gear ratio, and said estimating and controlling means include first estimating and controlling means for controlling said slip frequency of the motor by feeding back to the signal control part a first estimated signal indicative of an estimated value of said rotational speed of the motor estimated in accordance with said current of the motor detected by said motor current sensor, and second estimating and controlling means for controlling said slip frequency of the motor by feeding back to the signal control part a second estimated signal indicative of an estimated value of said rotational speed of the motor estimated in accordance with said vehicular speed detected by said vehicular speed sensor and said gear ratio detected by said gear ratio sensor.

3. A system as claimed in claim 2, further comprising:

means for comparing a signal indicative of said gear ratio detected by said gear ratio sensor with a predetermined value and generating a greater indicative signal when said signal is greater than said predetermined value.

4. A system as claimed in claim 3, wherein said selecting means include estimating and selecting means for selecting said first estimating and controlling means when said normal indicative signal fails to be generated and said greater indicative signal is generated, and for selecting said second estimating and controlling means when said normal indicative signal fails to be generated and said greater indicative signal fails to be generated.

5. A system as claimed in claim 1, further comprising:

means for warning of an anomaly of said motor rotational speed sensor when said estimating and controlling means have been selected at least once; and means for prohibiting said selecting means from carrying out a subsequent selection of said controlling means when said estimating and controlling means have been selected at least once.

6. A method of driving an electric automotive vehicle having a rotational speed sensor for detecting a rotational speed of a motor, an electrical power conversion part for the motor, and a signal control part for outputting a control signal to the power conversion part in accordance with an accelerator opening degree, the method comprising the steps of:

detecting a rotational speed of the motor and generating a rotational speed indicative signal indicative of the detected rotational speed;

detecting an operating condition of the electric automotive vehicle and generating an operating condition indicative signal indicative of the detected operating condition;

controlling a slip frequency of the motor by feeding back to the signal control part said rotational speed indicative signal;

estimating and controlling said slip frequency of the motor by feeding back to the signal control part an estimated rotational speed indicative signal indicative of an estimated value of said rotational speed of the motor estimated in accordance with said operating condition indicative signal;

determining whether or not the rotational speed sensor is normal and generating a normal indicative signal when the rotational speed sensor is normal; and selecting between said controlling step and said estimating, and controlling step to control said slip frequency of the motor by selecting said controlling step when said normal indicative signal is generated and selecting said estimating and controlling step when said normal indicative signal fails to be generated.

7. A method as claimed in claim 6, further comprising the steps of:

detecting a current of the motor and generating a current indicative signal indicative of the detected current;

detecting a vehicular speed and generating a vehicular speed indicative signal indicative of the detected vehicular speed; and detecting a gear ratio and generating a gear ratio indicative signal indicative of the detected gear ratio.

8. A method as claimed in claim 6, wherein said estimating and controlling step includes:

a first step of estimating and controlling said slip frequency of the motor by feeding back to the signal control part a signal indicative of said rotational speed of the motor estimated in accordance with said current indicative signal; and a second step of estimating and controlling said slip frequency of the motor by feeding back to the signal control part a signal indicative of said rotational speed of the motor estimated in accordance with said vehicular speed indicative signal and said gear ratio indicative signal.

9. A method as claimed in claim 8, further comprising the steps of:
   comparing a gear ratio indicative signal with a predetermined value and generating a greater indicative signal when said gear ratio indicative signal is greater than said predetermined value; and
   selecting said first step when said normal indicative signal fails to be generated and said greater indicative signal is generated, and selecting said second step when said normal indicative signal fails to be generated and said greater indicative signal fails to be generated.

10. A method as claimed in claim 6, further comprising the steps of:
   warning of an anomaly of the motor rotational speed sensor when said estimating and controlling step has been selected at least once; and
   prohibiting a subsequent selection of said controlling step when said estimating and controlling step has been selected at least once.

* * * * *